United States Patent
Sandt

(10) Patent No.: US 9,382,507 B2
(45) Date of Patent: Jul. 5, 2016

(54) MALOLACTIC FERMENTATION OF WINE

(75) Inventor: Bernd W. Sandt, Midland, MI (US)

(73) Assignee: Sandt Associates, Midland, MI (US)

( * ) Notice: Subject to any disclaimer, the term of this patent is extended or adjusted under 35 U.S.C. 154(b) by 1981 days.

(21) Appl. No.: 12/218,384

(22) Filed: Jul. 16, 2008

(65) Prior Publication Data

US 2010/0015277 A1    Jan. 21, 2010

(51) Int. Cl.
*C12G 1/022*    (2006.01)

(52) U.S. Cl.
CPC .......... *C12G 1/0203* (2013.01); *C12G 2200/05* (2013.01)

(58) Field of Classification Search
CPC .................................................. C12G 1/0203
USPC .................. 426/11, 12, 13, 15, 592
See application file for complete search history.

(56) References Cited

U.S. PATENT DOCUMENTS

| | | | | |
|---|---|---|---|---|
| 4,380,552 A | * | 4/1983 | Gestrelius et al. | 426/52 |
| 4,547,373 A | * | 10/1985 | Sandine et al. | 426/15 |
| 4,562,077 A | * | 12/1985 | King | 426/13 |
| 4,724,080 A | * | 2/1988 | Dau et al. | 210/651 |
| 5,059,431 A | * | 10/1991 | Daeschel et al. | 426/13 |
| 5,077,060 A | * | 12/1991 | Prahl | 426/15 |
| 5,104,665 A | * | 4/1992 | Fleet et al. | 426/15 |
| 6,033,887 A | * | 3/2000 | Charpentier | 435/178 |
| 2003/0003189 A1 | * | 1/2003 | Lutzker | 426/11 |
| 2003/0108493 A1 | * | 6/2003 | Henry et al. | 424/59 |
| 2003/0203069 A1 | * | 10/2003 | Prahl et al. | 426/11 |
| 2006/0153822 A1 | * | 7/2006 | Bou et al. | 424/93.45 |
| 2007/0009631 A1 | * | 1/2007 | Nielsen | 426/15 |
| 2008/0026100 A1 | * | 1/2008 | Villa et al. | 426/12 |

FOREIGN PATENT DOCUMENTS

DE    3546511    *    5/1987

OTHER PUBLICATIONS

Marquis et al. Polymerized Organic Salts of Sulfonic Acids Used as Dispersing Agents in Microbiology. Aug. 4, 1958. University of Michigan.*
Amerine et al. Table Wines. University of California Press, 1970, pp. 51, 109-108, 433.*

* cited by examiner

*Primary Examiner* — Vera Stulii
(74) *Attorney, Agent, or Firm* — Bernd W. Sandt

(57) ABSTRACT

A method for improving the malolactic fermentation in wines comprising conducting the malolactic fermentation using lactic acid bacteria with organic alkaline or neutral dispersing agent.

9 Claims, No Drawings

MALOLACTIC FERMENTATION OF WINE

FIELD OF INVENTION

The present invention provides an improved and novel method of achieving the decarboxylation of malic acid to lactic acid in grape wine. The malolactic fermentation is a key in the overall process of making most red wines as well as many white wines and is particularly important in wines from grapes grown in cooler climates which have a tendency of exhibiting a high acid content. Malolactic fermentation in wine is caused by bacteria capable of decarboxylating malic acid to lactic acid. Although capable of occurring naturally through the growth of lactic acid bacterial species present in wines, the desired fermentation is greatly improved by the controlled addition of bacteria separately grown for that purpose. The present invention relates to the addition of such bacteria.

BACKGROUND OF THE INVENTION

There is little doubt that the majority of wines significantly benefit from malolactic fermentation, through a reduction in acidity and the development of subtle flavors that contribute to the complexity of sensory quality. Moreover, the vast majority of wine makers will not bottle their wines, particularly their red wines, until malolactic fermentation has been completed, because subsequent fermentation in the bottle, which can occur naturally, destroys the taste of the wine.

The traditional method of malolactic fermentation, which is still used commercially even today, is to rely on naturally occurring malolactic fermentation, as a consequence of the growth of lactic acid bacteria, such as *Leuconostoc oenos*, indigenous in the wine. The malolactic fermentation converts the malic acid in the wine to lactic acid which reduces the acidity and adds a softer flavor to the wine. However such fermentation is unpredictable as if and when it occurs after the initial fermentation. There has been a strong move by wine makers to induce malolactic fermentation by adding cultures of lactic acid bacteria such as *Leuconostoc oenos*, although not limited to such. Thus other lactic acid bacteria including other forms of the *lactobacillus, pediococus* and *leuconostoc* bacteria have also been used.

One method employed to initiate controlled malolactic fermentation is to add a small proportion of another wine that is already undergoing the fermentation and thus contains a high number of malolactically active bacteria. The bacteria in the added wine are adapted to wine conditions and will usually be capable of initiating or completing the malolactic fermentation in the seeded wine. An easier way to initiate malolactic fermentation is to use freeze-dried or frozen starter cultures of lactic acid bacteria, which are commercially available. The freeze-dried or frozen starter cultures should be adapted for the fermentation before adding the bacteria to the wines to undergo malolactic fermentation. Typically the adaptation process comprises an initial thawing and/or rehydration process, the latter comprising dissolving the freeze dried composition in water and adding various nutrients such as sugar, vitamins, minerals or yeast extract and keeping the resulting solution at room temperature for at least sixty minutes. The rehydrated or thawed bacteria are then normally subjected to an activation step normally lasting from three to four days in a medium which generally comprises grape juice or dilute wine to which yeast extract has been added. The resulting activated lactic acid bacteria are then added to wine subsequent to the alcoholic fermentation to initiate and/or complete the malolactic fermentation. Other methods of activating are known in the art and can be similarly employed in the present invention.

The addition of the concentrates of the malolactic active bacteria, even when added in sufficient concentration is frequently subject to a slow and nonuniform conversion of the malic to lactic acid. Agitation is not seen as being beneficial and can adversely affect the quality of the resulting wine. Such slow conversion may also be the result of the high acidity of the wine to be converted. It is desirable to achieve rapid and uniform conversion of the malic acid with bacteria concentrates specifically developed for malolactic fermentation in that competing growth of indigenous lactic acid bacteria adds undesirable flavors to the wine and should be minimized. It is further desirable to be able to conduct the malolactic fermentation with higher acidity wines that would otherwise inhibit or slow the conversion of the malolactic fermentation.

SUMMARY OF THE INVENTION

It is an object of this invention to provide improved methods of conducting malolactic fermentation in wines to reduce the acidity of such wines. A further object is to decrease the time necessary in malolactic fermentation to achieve essentially complete conversion of the malic acid containing wine to lactic acid. It is also an object of this invention to optimize the taste of the wine. Another object of the invention is to reduce or prevent the malolactic fermentation by indigenous lactic acid bacteria. Still another object is to able to conduct malolactic fermentation with wines of higher acidity, which otherwise would inhibit malolactic fermentation.

These and other objects are achieved by conducting the malolactic fermentation in the presence of an alkaline to neutral dispersing agent. Acidic dispersing agents are not seen as improving malolactic fermentation and can inhibit such. Thus the dispersing agent is added to the wine to be decarboxylated in combination with the bacteria concentrate to initiate the malolactic fermentation of wine that has proceeded through the alcoholic fermentation. The dispersing agent is added in concentration sufficient to cause uniform distribution of the bacteria in the wine and also reduce the acidity of the wine to be converted but excess concentrations that can affect the taste of the wine should be avoided. Obviously the dispersing agent should be one that is of food quality and has the GRAS (Generally recognized as safe) label.

DETAILED DESCRIPTION OF THE INVENTION

The present invention is based on the concept that the addition of minor amounts of an alkaline to neutral, edible dispersing agent in combination with sufficient lactic active bacteria improves the malolactic fermentation and allows it to be conducted in higher acidic environments and/or at a faster rate than would be possible in the absence of the dispersing agent. In providing for a more complete and faster decarboxylation of the malic acid by the added bacteria, the method of the present invention reduces or prevents the formation of lactic acid from malic acid by indigenous bacteria, which can adversely affect the taste. An additional benefit of the addition of a dispersant is the ease of filtering the wine after the completion of the malolactic fermentation or otherwise separating the residues of the alcoholic and /or the malolactic fermentation.

The lactic acid bacteria used in the present invention are generically the *leuconostoc, lactobacillus* and *pediococcus* bacteria. The preferred species being the *leuconostoc* bacteria and specifically the *leuconostoc oenos* bacteria because of their ability to decarboxylate malic acid at relatively low pH levels, such as less than 3.5, and alcohol levels prevalent in wine after the alcoholics fermentation, such as 11 to 14%. The alkalinity of the dispersing agent lends an additional positive effect to the speed and completion of the malolactic fermentation.

The use of these bacteria has been well established in the art and suitable concentrates are commercially available in freeze-dried or dehydrated forms. Adequate concentrations for the malolactic fermentation furthermore can be grown from strains deposited in public organizations such as the Northern Regional Research Laboratories in Peoria Ill. or Deutsche Sammlung von Mikroorganisms in Braunschweig, Germany in accordance with Budapest treaty on the International Recognition of the Deposits of Microorganisms for the Purpose of Patent Protection. Dehydrated bacteria are generally rehydrated in water, juice or wine before adding to the wine to be decarboxylated. It is preferred that the dehydrated bacteria furthermore be activated in a growth medium that adapts the bacteria to the wine to which the colonies are to be added. Such medium in addition to containing some of the wine to be converted subsequently can contain compatible carbohydrates, other nutrients, yeast extract and vitamins. A similar activation and/or adaption procedure is also used for freeze-dried colonies. Procedures for preparing bacteria colonies for use in the decarboxylation of malic acid from freeze dried or dehydrated storage facilities are well known in the literature.

The concentration of the bacteria to be added can vary depending on the conditions to which the lactic acid bacteria are exposed in the wine to be converted as well as to the type of lactic acid bacteria employed. Thus at low pH and high alcohol conditions the growth of the bacteria colonies can be inhibited and thus a larger concentration of bacteria should be added. In general the concentration of bacteria ranges from about $10^4$ to $10^{13}$ colony forming units per ml of the wine, CFU/ml, and preferably in the range of $10^6$ to $10^8$ CFU/ml of the wine to be decarboxylated. Viable counts of the colony forming units can be conducted by the spread plate method using various media such as agar.

The dispersing agents added in combination with the lactic acid bacteria are alkaline to neutral organic dispersants that are considered safe for human consumption (GRAS). The alkaline dispersants include the phospholipids and the alginates. Neutral dispersants to be employed in the present invention are polysaccharides and in particular naturally occurring gums such as alginates, guar gum, carrageenan, and xanthan. The preferred dispersant in all instances is lecithin derived from soybeans. Concentrations can vary widely but should be sufficient to evenly distribute the bacteria. In the case of the polysaccharides the concentration should be kept low enough to avoid any thixotropic thickening effects. Preferably the concentration ranges from 0.005 to 2.5% by weight of the wine to be decarboxylated. The actual amount is controlled in part by the flavor, if any, that is imparted to the wine as a result of the addition of the dispersing agent as well as the ability of the lactic acid bacteria to effect the decarboxylation of the malic acid. Optimum conditions should be established experimentally for each type of wine and bacteria culture by small scale testing. Depending on the acidity of the wine excess dispersing agent might be added which after the completion of the malolactic fermentation can be removed through fining and/or filtration if such excess affects the taste of the wine. A preferred fining agent is bentonite, although other fining agents such as kaolin, casein, and albumin can also be used. Use of bentonite as a fining agent is well known.

The process of the present invention can be applied to wines derived from grapes giving rise to dry white, rose or red wines. More specifically it is employed with wines grown in cooler climates that have high acidities. Although the method of the present invention is generally employed with wines from vinifera grapes it can also be used with wines from hybrid grapes. As indicated above the combination of bacteria and dispersant is preferably added to the wine during or after the final stages of the alcoholic fermentation. The red wines should be pressed to remove skins and seed before malolactic fermentation is initiated. It is not necessary to rack the wine to remove the yeast bacteria employed to cause the alcoholic fermentation. The addition can be in combination with the addition of the lactic acid bacteria or either before or after the addition of such although preferably the dispersing agent is added simultaneously with the bacteria. The progress and the completion of the malolactic fermentation is established by measuring the change in the concentration of the malic acid by means of gas/liquid chromatography or enzymatically as is known in the art. Additional measurements giving an indication of the conversion to lactic acid are the increase in the pH and in the increase of the bacterial counts. No special equipment is required for the conduct of the malolactic fermentation using the alkaline dispersants of the present invention. Although it is desirable to agitate the wine during the initial addition of the lactic acid bacteria and the alkaline dispersant, once the bacteria have been distributed no further agitation is required.

The present invention is further illustrated by the following examples, which are not to be construed as limiting the invention.

EXAMPLE 1

The wine used in the example was obtained from the alcoholic fermentation of crushed Pinot Noir grapes grown in the Leelanau peninsula of Michigan. The must had been inoculated with rehydrated suspension of commercially available strains of the yeast *Saccharomyces cerevisiae* to cause the alcoholic fermentation, which generally is substantially completed after six days when conducted at 18 to 20° C. The fermented wine is then pressed and racked. Wine fermented as described generally has a malic acid content of 3.2 g/l.

About 5 gallons of the wine are further processed according to this example. The wine generally has a titratable acidity of 8.5 to 10.5 g/liter and a pH of 3.21 to 3.56 depending on the climate prevailing in that year. The alcohol content of the wine is 11.8% to 12.4%. Metasulfite at a concentration of 25 ppm is added at the time of the crush. Approximately 250 ml of the wine is removed from the wine and sufficient commercially available lecithin ("Yelkin TS" from Archer Daniels Midland) is dissolved in the 250 ml to provide a 0.3% by weight concentration of lecithin in the wine. Freeze dried *Leuconostoc oenos* bacteria in a concentration of $1 \times 10^6$ to $1 \times 10^7$ CFU per ml of wine to be fermented is rehydrated and activated over a three day period in another 250 ml sample of the wine and is then added to the wine together with the lecithin solution while the wine is subjected to gentle agitation and maintained at a temperature of 18-20° C. The change in the malic acid concentration and *L. oenos* population is measured on a daily basis following the addition of the dispersant and the *L. oenos*. The *L. oenos* bacteria are counted by the well known spread plate method and the change in the malic acid concentration is measured using gas liquid chromatography as well as pH. While the bacteria count increased only slightly, the malic acid concentration decreases over a period of ten days to less than 0.5 g/l. The experiment without the addition of the lecithin solution does not result in a decrease in the concentration of malic acid until 28 days after the addition of the bacteria and is not as complete as with the addition of the lecithin solution.

The resulting wine is treated with a sterile 3% w/v stock solution of commercial grade bentonite so that the wine contained the bentonite at a concentration of 0.036% w/v. The wine is allowed to remain quiescent for a period of eight hours at 20° C. and then centrifuged and decanted to remove the added bentonite. No difference in the taste of the wine can be detected as a result of the addition of the lecithin.

EXAMPLE 2

The wine used in the example was obtained from the alcoholic fermentation of pressed Chardonnay grapes grown in the Leelanau peninsula of Michigan. The must had been inoculated with rehydrated suspension of commercially available strains of the yeast *Saccharomyces cerevisiae* to cause the alcoholic fermentation, which generally is substantially completed after six days when conducted at 18 to 20° C. The fermented wine is then racked to remove the yeast residues. Wine fermented as described generally has a malic acid content of 3.22 g/l.

About 5 gallons of the wine are then further processed. The wine generally has a titratable acidity of 8.0 to 10 g/liter and a pH of 3.4 to 3.56 depending on the climate prevailing in that year. The alcohol content of the wine is 11.2% to 12.0%. Metasulfite at a concentration of 25 ppm is added at the time of the press. Approximately 250 ml of the wine is removed from the wine and sufficient guar gum is dissolved in the 250 ml to provide a 0.2% concentration of gum in the wine to be decarboxylated Freeze dried *Leuconostoc oenos* bacteria in a concentration of $1 \times 10^6$ to $1 \times 10^7$ CFU per ml of wine to be decarboxylated is rehydrated and activated over a three day period in another 250 ml sample of the wine and is then added to the wine together with the gum solution while the wine is subjected to gentle agitation and maintained at a temperature of 18-20° C. The change in the malic acid concentration and *L. oenos* population is measured on a daily basis following the addition of the dispersant and the *L. oenos*. The *L. oenos* bacteria are counted by the well-known spread plate technique and the change in the malic acid concentration is measured using gas liquid chromatography as well as pH. While the bacteria count stayed essentially the same, the malic acid concentration decreased over a period of 12 days to about 0.2 g/l and the pH increased to about 5.2. Repeating the malolactic fermentation of the wine without the addition of the gum solution does not result in a decrease in the concentration of malic acid until 20 days after the addition of the bacteria and is not as complete as with the addition of the gum solution.

The resulting wine is treated with a sterile 3% w/v stock solution of commercial grade bentonite so that the wine contained the bentonite at a concentration of 0.036% w/v. The wine is allowed to remain quiescent for a period of eight hours at 20° C. and then centrifuged and decanted to remove the added bentonite. The same fining result is also obtained by filtration through a Millipore 0.45 mu membrane using a pressure pump. No difference in the taste of the wine can be detected as a result of the addition of the gum.

The invention claimed is:

1. A method for conducting the malolactic fermentation of wine, comprising dispersing a viable count of leuconostoc bacteria in wine with an added GRAS dispersing agent selected from the class consisting of phospholipids, guar gum, carageenan and xanthan, after the essential completion of the alcoholic fermentation, in sufficient quantity to distribute the bacteria in the wine.

2. The method of claim 1 wherein the *leuconostoc* bacteria are *leuconostoc oenos* bacteria.

3. The method of claim 1 wherein the dispersing agent is a phphospholipid.

4. The method of claim 3 wherein the phospholipid is lecithin.

5. The method of claim 1 wherein the dispersing agent is guar gum, carageenan or xanthan.

6. The method of claim 1 wherein the wine is derived from vinifera grapes and has an alcoholic content of 11 to 14%.

7. The method of claim 1 wherein the lactic acid bacteria concentration is in the range of $10^6$ to $10^8$ CFU/ml of the wine and the concentration of the dispersant is in the range of 0.005 to 2.5% by weight.

8. The method of claim 1 wherein the wine after the completion of the malolactic fermentation is treated with a fining agent.

9. The method of claim 8 wherein the fining agent is bentonite.

\* \* \* \* \*